(12) United States Patent
Ko

(10) Patent No.: US 11,882,440 B2
(45) Date of Patent: Jan. 23, 2024

(54) AUTHENTICATION SYSTEM AND METHOD FOR CONNECTED CAR SERVICE

(71) Applicants: Hyundai Motor Company, Seoul (KR); Kia Corporation, Seoul (KR)

(72) Inventor: Jaeyoon Ko, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 233 days.

(21) Appl. No.: 17/349,173

(22) Filed: Jun. 16, 2021

(65) Prior Publication Data

US 2022/0210638 A1 Jun. 30, 2022

(30) Foreign Application Priority Data

Dec. 28, 2020 (KR) .................. 10-2020-0184402

(51) Int. Cl.
  *H04W 12/06* (2021.01)
  *G06F 21/36* (2013.01)
  *H04W 8/20* (2009.01)
  *G06K 19/06* (2006.01)

(52) U.S. Cl.
  CPC .......... *H04W 12/06* (2013.01); *G06F 21/36* (2013.01); *G06K 19/06037* (2013.01); *H04W 8/20* (2013.01)

(58) Field of Classification Search
  CPC ......... H04W 12/06; H04W 8/20; G06F 21/36; G06K 19/06037
  USPC ......................................... 455/411
  See application file for complete search history.

(56) References Cited

U.S. PATENT DOCUMENTS

2011/0264916 A1* 10/2011 Fischer .................. G07C 5/008
  713/175

* cited by examiner

*Primary Examiner* — Joel Ajayi
(74) *Attorney, Agent, or Firm* — Slater Matsil, LLP

(57) ABSTRACT

An embodiment user authentication system for a connected vehicle service includes a service terminal configured to encrypt first vehicle identification information comprising identification information of a vehicle system and terminal identification information comprising identification information of the service terminal to generate a service identification (ID) comprising identification information of the connected vehicle service, and to display the service ID on a display screen as an optically readable code, and a user terminal configured to receive the service ID by scanning the code and to transmit the received service ID to a service server through an external network to request a user authentication.

16 Claims, 4 Drawing Sheets

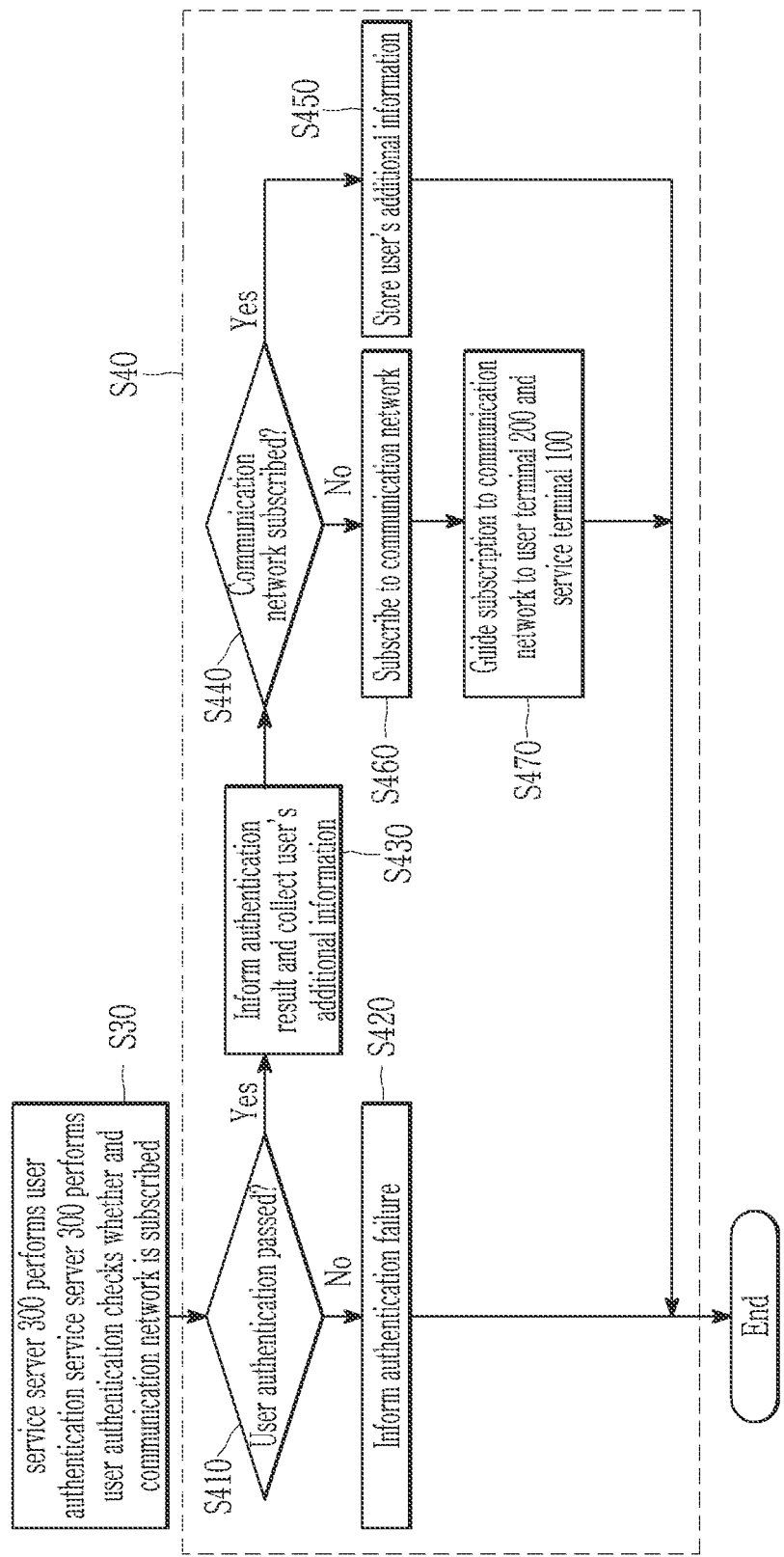

AUTHENTICATION SYSTEM AND METHOD FOR CONNECTED CAR SERVICE

CROSS-REFERENCE TO RELATED APPLICATIONS

This application claims the benefit of Korean Patent Application No. 10-2020-0184402, filed in the Korean Intellectual Property Office on Dec. 28, 2020, which application is hereby incorporated herein by reference.

TECHNICAL FIELD

The present disclosure relates to an authentication system and method for a connected car service.

BACKGROUND

A connected vehicle or vehicle means a vehicle connected to a network to be capable of providing various services. The concept of connected vehicles is one of various concepts for future vehicles such as an autonomous driving vehicle, a smart car capable of providing intelligent services, etc.

The concept of connected vehicles began with telematics. Telematics, a compound word of Telecommunication and Informatics, combines vehicle and wireless communication to provide services such as Internet connection, vehicle position identification in real time, remote control and diagnosis of a vehicle, accident prevention through danger warning, and traffic information. Recently, with the spread of the Internet of Things (IoT), connected vehicles aim to realize autonomous driving as well as to provide infotainment from vehicles beyond the function of telematics in the early days. At this time, infotainment is a compound word of information and entertainment, meaning information delivery and entertainment.

Meanwhile, various services (hereinafter, referred to as connected vehicle services) provided to a connected vehicle require user authentication. This is because, in connecting the vehicle and the external network, there is a concern about leakage of private information and the cost problem of using the communication network.

Conventionally, when a service terminal mounted on a vehicle system in order to provide a connected vehicle service is in a state in which communication with an external network is available, a user (client) requests transmission of an authentication code at a service subscription channel through a user terminal (e.g., smart phone, etc.). Then, the server providing the connected vehicle service transmits the authentication code to a service terminal installed on the vehicle owned by the user, and the service terminal displays the received authentication code to a display screen. Thereafter, the user inputs an authentication code to the smart phone to request user authentication to the server.

However, when the communication between the service terminal and the external network is not available, for example, when the communication modem of the service terminal has not subscribed to the communication network or the use of the communication network is terminated, the user authenticates by calling the call center counselor with the user terminal to submit information and materials (vehicle registration certificate, etc.), and the call center counselor allows the user authentication after reviewing the submitted documents. Alternatively, a fixed authentication code is displayed on the service terminal, and the user inputs the displayed authentication code to the user terminal to transmit it to the server for user authentication.

That is, when the service terminal is in the state that it is not capable of communicating with the external network, processes for calling the call center counselor and submitting required documents make the use of the connected vehicle service cumbersome, and it takes some time for the call center counselor to review the submitted documents and allow the authentication. In addition, according to the scheme of performing user authentication by displaying a fixed authentication code on the service terminal, a security problem may arise due to leakage of the authentication code.

The above information disclosed in this Background section is only for enhancement of understanding of the background of embodiments of the invention, and therefore it may contain information that does not form the prior art that is already known to a person of ordinary skill in the art.

SUMMARY

Embodiments of the present invention provide an authentication method for connected vehicle service and a system providing the method that is capable of performing user authentication in the case that the service terminal providing the connected vehicle service is not capable of communicating with an external network, as well as in the case that the service terminal providing the connected vehicle service is not capable of communicating with an external network.

An exemplary user authentication system for connected vehicle service may include a service terminal configured to display a service ID on a display screen in a form of an optically readable code, the service ID being identification information of the connected vehicle service, and a user terminal configured to receive the service ID by scanning the code and to transmit the received service ID to a service server through an external network to request user authentication. The service terminal may be configured to encrypt first vehicle identification information that is identification information of a vehicle system and terminal identification information that is identification information of the service terminal to generate the service ID.

The service terminal may be configured to receive the first vehicle identification information from the vehicle system when the vehicle system is turned on, and to call a first service ID that was generated and stored previously, to display in a form of an optically readable code, when the received first vehicle identification information and a previously stored second vehicle identification information match.

The service terminal may be configured to, when the received first vehicle identification information and the previously stored second vehicle identification information do not match, encrypt the first vehicle identification information and the terminal identification information to generate a second service ID, and display the generated second service ID in a form of an optically readable code.

The optically readable code may be a 2-dimensional QR code.

The vehicle identification information may be a vehicle identification number (VIN).

The service terminal may include a communication modem communicating with an external network. The terminal identification information may be a serial number of the communication modem.

The service server may be configured to decrypt the service ID that is transmitted after encryption, to pass the user authentication when information included in the decrypted service ID matches vehicle identification information and terminal identification information that was previously stored, and not to pass the user authentication when information included in the decrypted service ID does not match the vehicle identification information and the terminal identification information that was previously stored.

The service server may be configured to check whether the communication modem is in a subscribed state to a communication network, and request a communication company to open the communication network for the communication modem when the communication modem is in an unsubscribed state.

An exemplary user authentication method for performing a connected vehicle service may include displaying, by a service terminal, a service ID as an optically readable code, the service ID being identification information of the connected vehicle service, receiving, by a user terminal, the service ID by scanning the code and transmitting the received service ID to a service server through the external network to request user authentication, decrypting, by the service server, the service ID that is transmitted after encryption, and performing the user authentication by comparing information included in the decrypted service ID with vehicle identification information and terminal identification information that was previously stored. The displaying, by the service terminal, the service ID as the optically readable code may include encrypting a first vehicle identification information that is identification information of the vehicle system and a terminal identification information that is identification information of the service terminal, to generate the service ID.

The displaying, by the service terminal, the service ID as the optically readable code may include receiving the first vehicle identification information from the vehicle system when the vehicle system is turned on, determining whether the received first vehicle identification information and previously stored second vehicle identification information match, and when matched as a result of the determining, calling a first service ID that was previously generated and stored, and displaying the first service ID on a display screen in a form of the optically readable code.

The displaying, by the service terminal, the service ID as the optically readable code further may include, when not matched as a result of the determining, encrypting the first vehicle identification information and the terminal identification information to generate a second service ID and displaying the generated second service ID in a form of the optically readable code.

The optically readable code may be a 2-dimensional QR code.

The vehicle identification information may be a vehicle identification number (VIN).

The terminal identification information may be a serial number of a communication modem included in the service terminal and communicating with an external network.

An exemplary user authentication method may further include transmitting, by the service server, a user authentication result to the user terminal. The transmitting, by the service server, the user authentication result to the user terminal may include, when the user authentication is passed, requesting additional information for the connected vehicle service subscription to the user terminal to complete the connected vehicle service subscription, and when the connected vehicle service subscription is completed and the communication modem is in an unsubscribed state to the communication network, requesting subscription of the communication modem to a preset communication company.

According to an embodiment, the user authentication may be performed even if communication between the service terminal and the external network is not available.

According to an embodiment, user authentication may be performed in real time, thereby achieving cost reduction effect and improving user satisfaction of a user who uses the connected vehicle service.

According to an embodiment, a dynamically generated authentication code instead of a fixed authentication code is used, i.e., a user ID is displayed as a QR code on a display screen to perform the user authentication, thereby improving security issues.

BRIEF DESCRIPTION OF THE DRAWINGS

FIG. 4 is a flowchart showing details of the step S40 in FIG. 2 for transmitting a user authentication result.

DETAILED DESCRIPTION OF ILLUSTRATIVE EMBODIMENTS

Figure 1:
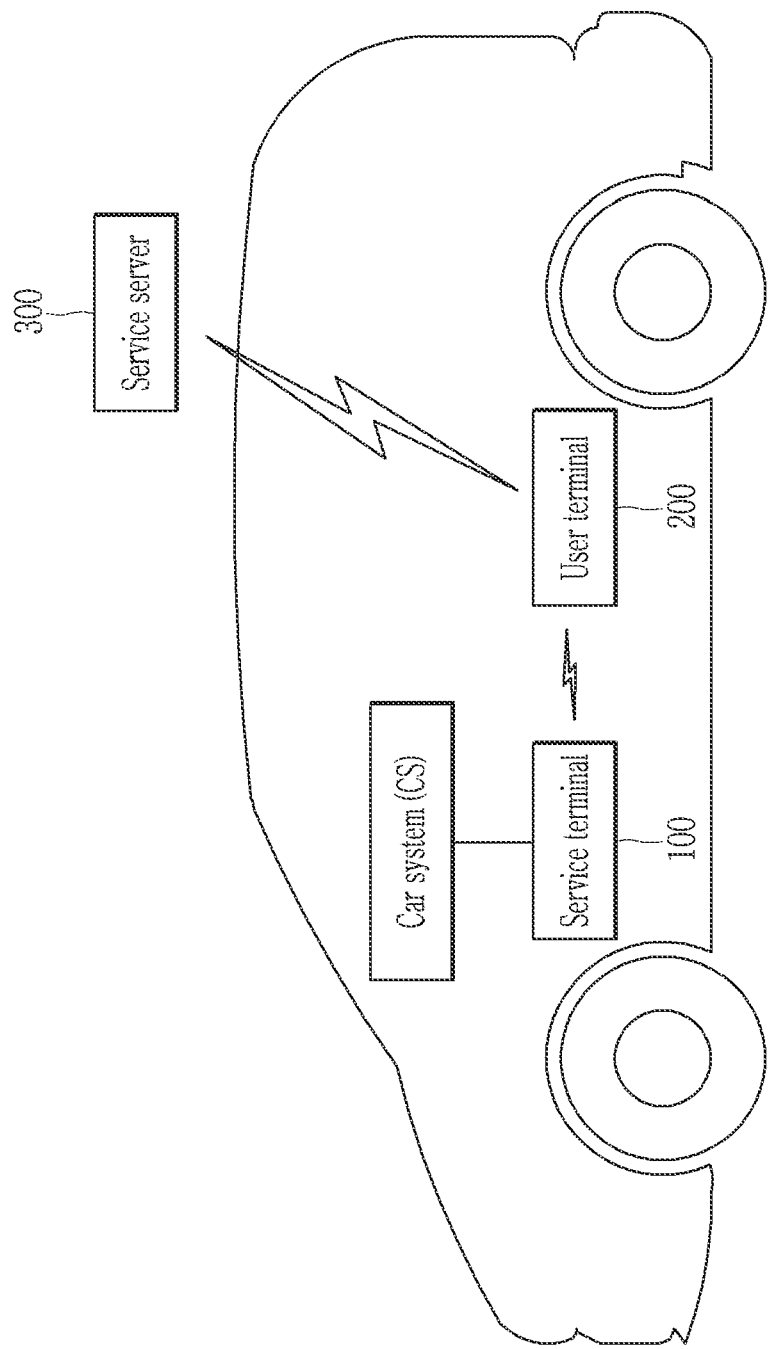
FIG. 1 illustrates an authentication system for a connected vehicle service according to an exemplary embodiment.

Hereinafter, exemplary embodiments disclosed in the present specification will be described in detail with reference to the accompanying drawings. In the present specification, the same or similar components will be denoted by the same or similar reference numerals, and a repeated description thereof will be omitted. Terms "module" and/or "unit" for components used in the following description are used only in order to easily describe the specification. Therefore, these terms do not have meanings or roles that distinguish them from each other in and of themselves. In describing exemplary embodiments of the present specification, when it is determined that a detailed description of the well-known art associated with the present invention may obscure the gist of the present invention, it will be omitted. The accompanying drawings are provided only in order to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. Further, it is to be understood that when one component is referred to as being "directly connected" or "directly coupled" to another component, it may be connected or coupled directly to the other component without a further component intervening therebetween.

It will be further understood that terms "comprise" and "have" used in the present specification specify the presence of stated features, numerals, steps, operations, components, parts, or combinations thereof, but do not preclude the presence or addition of one or more other features, numerals, steps, operations, components, parts, or combinations thereof.

FIG. 1 illustrates an authentication system for a connected vehicle service according to an exemplary embodiment.

Referring to FIG. 1, an authentication system for a connected vehicle service includes a service terminal 100, a user terminal 200, and a service server 300.

The service terminal 100 connects the external network and vehicle system (car system) CS to provide various connected vehicle services that may be provided through the external network to users on board the vehicle. For example, the connected vehicle service may include at least one of an Internet connection, vehicle position identification in real time, remote control and diagnosis of a vehicle, accident prevention through danger warning, providing traffic information, autonomous driving, and a V2X (vehicle to X) service.

The service terminal 100 includes a communication modem (not shown) capable of communicating with the external network. According to an exemplary embodiment, the communication modem may include a serial number, which is unique identification information. For example, the service terminal 100 may use a serial number of the communication modem as terminal identification information to identify the service terminal 100.

The service terminal 100 may receive vehicle identification information from the controller of the vehicle system CS when the vehicle system is turned on. For example, the service terminal 100 may receive and store the vehicle identification information whenever the vehicle system CS is turned on.

According to an exemplary embodiment, turning on the vehicle system CS may include entering an accessory (ACC) mode. The ACC mode is a mode in which various service devices (radio, navigation, clock, air conditioner, heater, etc.) may be used although the engine is not started.

The user terminal 200 is a terminal device possessed by the user that may be provided with the connected vehicle service. For example, the user terminal 200 is a terminal device possessed by the user on board the vehicle, and the user may not be limited to the owner of the vehicle.

The user terminal 200 includes, for example, a communication module capable of communication with the external network, and may include various portable electronic devices, such as a smart phone, a tablet PC, etc., that is capable of scanning a code displayed on a display screen of the service terminal 100.

The service server 300 provides various data requested by the service terminal 100 such that the connected vehicle service may be provided to users. According to an exemplary embodiment, the service server 300 may determine a pass or fail for user approval requested through the user terminal 200 by a user who intends to receive the connected vehicle service. In addition, when the user approval passes, the service server 300 may request the communication company to open the communication network for the communication modem in the unsubscribed state included in the service terminal 100.

Figure 2:
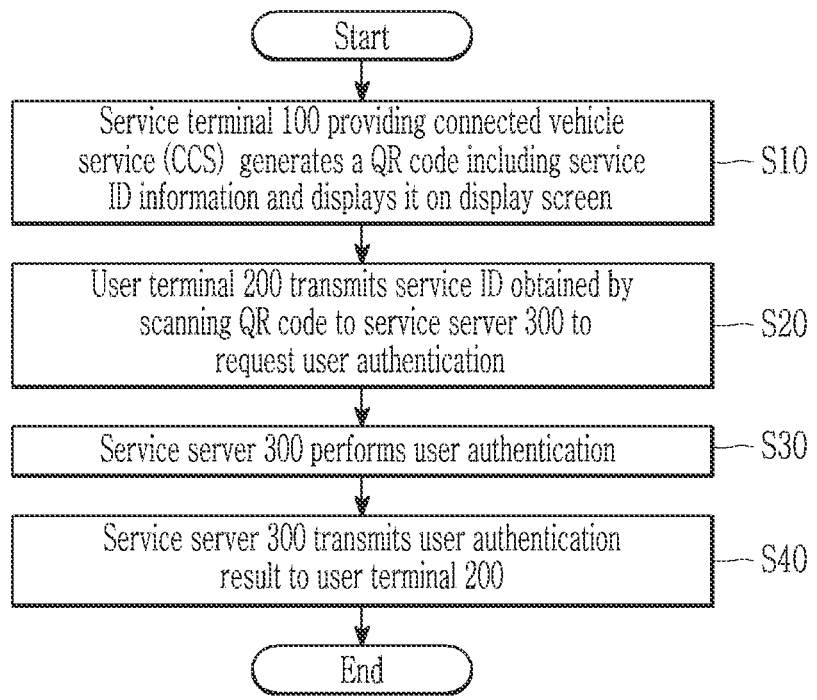
FIG. 2 is a flowchart showing an authentication method for a connected vehicle service according to an exemplary embodiment.
Figure 3:
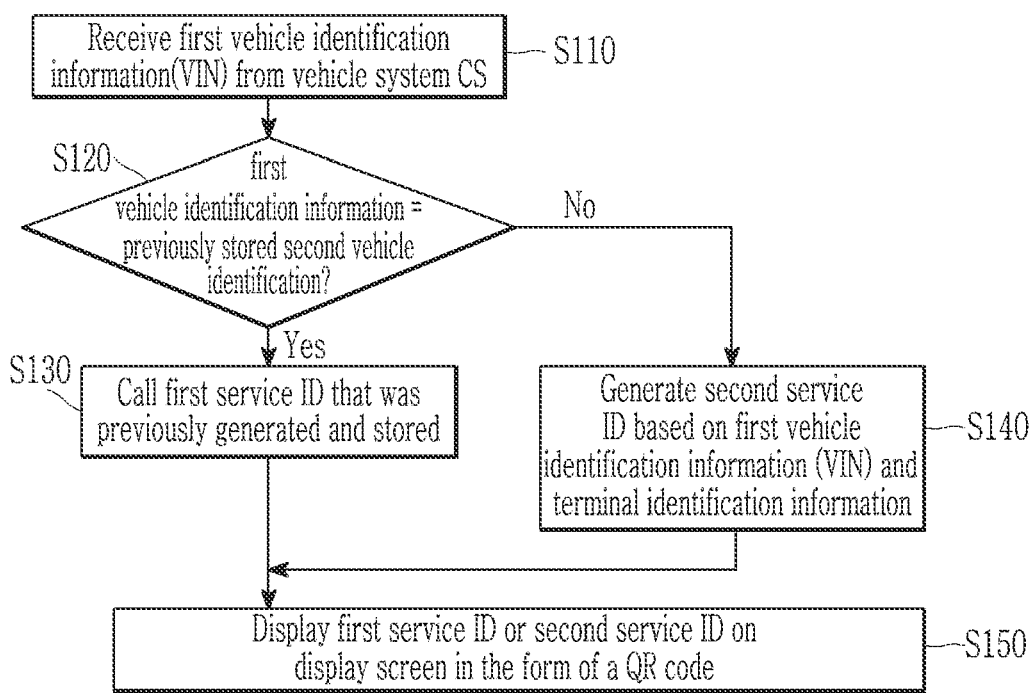
FIG. 3 is a flowchart showing details of the step S10 in FIG. 2 for generating a service ID and displaying it on a display screen.

FIG. 2 is a flowchart showing an authentication method for the connected vehicle service according to an exemplary embodiment, FIG. 3 is a flowchart showing details of the step S10 in FIG. 2 for generating service ID and displaying it on a display screen, and FIG. 4 is a flowchart showing details of the step S40 in FIG. 2 for transmitting user authentication result.

Hereinafter, an authentication system for the connected vehicle service and method is described in detail with reference to FIG. 1 to FIG. 4.

Referring to FIG. 2, at step S10, the service terminal 100 displays the service ID, which is identification information of the connected vehicle service, on a display screen as an optically readable code.

The service ID may be the identification information for distinguishing a user who uses the connected vehicle service. For example, the connected vehicle service may include various service items, and fees for the various service items may be different. When a user subscribes to the connected vehicle service, the user may select the service item to be provided and pay the fee set accordingly. For example, the service server 300 provides a service corresponding to the service item included in the service ID, and may charge the user for a preset fee.

At the step S10, referring to FIG. 3, the service terminal 100 may receive a first vehicle identification information from the controller of the vehicle system CS at step S110. For example, the service terminal 100 may receive the first vehicle identification information whenever the vehicle system CS is turned on.

According to an exemplary embodiment, turning on the vehicle system CS may include entering an ACC mode. The ACC mode is a mode in which various service devices (radio, navigation, clock, air conditioner, heater, etc.) may be used although the engine is not started.

At the step S10, specifically at step S120, the service terminal 100 compares the first vehicle identification information with a second vehicle identification information to determine whether they match.

The vehicle identification information may be unique identification information of the vehicle system CS. For example, the vehicle identification information may include a vehicle identification number (VIN), which is a unique vehicle identification number assigned to each vehicle, but is not limited thereto. The VIN has the same function as the vehicle's social security number, and may be referred to as a vehicle identification number or a chassis number.

The first vehicle identification information is the vehicle identification information transmitted from the vehicle system CS at the current time when the vehicle system CS is turned on. The second vehicle identification information may be a previously stored vehicle identification that was transmitted from the vehicle system CS at a previous time when the vehicle system CS was turned on.

When the first vehicle identification information matches the second vehicle identification information (S120—Yes), the service terminal 100 calls, at step S130, a first service ID that was generated and stored previously.

The first service ID may be generated by encrypting the terminal identification information and the second vehicle identification information transmitted from the vehicle system CS at the previous time when the vehicle system CS was turned on. The first service ID generated in this way may be stored in the service terminal 100.

The terminal identification information is information identifying the service terminal 100, and according to an exemplary embodiment, may include the identification information of the communication modem (not shown) included in the service terminal 100. For example, the terminal identification information may include a serial number of the communication modem.

When the first vehicle identification information does not match the second vehicle identification information (S120—No), the service terminal 100 encrypts the first vehicle identification information and the terminal identification information to generate a second service ID, at step S140. In more detail, the second service ID may be generated by encrypting the terminal identification information and the second vehicle identification information transmitted from the vehicle system CS at the current time when the vehicle system CS is turned on. At this time, the encryption algorithm may be implemented with various algorithms known in the art, and will not be described in further detail.

In summary, when the vehicle system CS is turned on, the service terminal 100 receives the first vehicle identification information and compares it with the previously stored second vehicle identification information. When they match, the service terminal 100 may use the service ID that was generated and stored previously. When they do not match, the service terminal 100 may generate a new service ID based on the new vehicle identification information.

At the step S10, specifically at step S150, the service terminal 100 may display the service ID on the display screen in the form of the optically readable code. For example, the optically readable code may include a 1-dimensional barcode or a 2-dimensional QR code, and may preferably be a QR code.

Subsequently, at step S20, the user terminal 200 may scan the code displayed on the display screen to receive the information indicating the service ID, and transmit the received service ID to the service server through the external network to request the user authentication.

Subsequently, at step S30, the service server 300 decrypts the encrypted and transmitted service ID, and compares the information contained in the decrypted service ID with the vehicle identification information and the terminal identification information that was previously stored in a database (not shown) to perform the user authentication.

For example, when both the vehicle identification information and the terminal identification information included in the service ID match the previously stored vehicle identification information and the terminal identification information, the service server 300 may pass the user authentication. When at least one of the vehicle identification information and the terminal identification information does not match, the service server 300 may not pass the user authentication. At this time, the service server 300 may check whether the communication modem included in the service terminal 100 is in a subscribed state to the communication network.

Subsequently, at step S40, the service server 300 transmits the user authentication result to the user terminal 200.

At the step S40, specifically at step S420, referring to FIG. 4, when the user authentication is not passed (S410—No), the service server 300 transmits a message indicating that the user authentication has not passed to the user terminal 200.

At the step S40, specifically at step S430, when the user authentication is passed (S410—Yes), the service server 300 transmits a message indicating that the user authentication is passed, and requests a user's additional information for completing the connected vehicle service subscription.

According to an exemplary embodiment, when the user transmits the user's additional information to the service server 300 through the user terminal 200, the subscription of the connected vehicle service is completed.

At the step S40, specifically at step S450, after the subscription of the connected vehicle service is completed, the communication modem of the service terminal 100 is in a subscribed state to the communication network (S440—Yes), the service server 300 stores the additional information transmitted by the user in order to complete the connected vehicle service subscription.

At the step S40, specifically at step S460, after the subscription of the connected vehicle service is completed, the communication modem of the service terminal 100 is in an unsubscribed state to the communication network (S440—No), the communication modem may request the communication company to open the communication network for the communication modem of the service terminal 100.

At the step S40, specifically at step S470, the service terminal 100 transmits the subscription result of the communication modem to the communication network to the service terminal 100 and the user terminal 200.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A user authentication system for a connected vehicle service, the user authentication system comprising:
   a service terminal;
   a user terminal; and
   a service server;
   wherein the service terminal is configured to:
      receive first vehicle identification information from a vehicle system when the vehicle system is turned on;
      encrypt the first vehicle identification information and terminal identification information of the service terminal, the terminal identification information having been previously stored in the service terminal;
      generate a service identification (ID) based on the first vehicle identification information and the terminal identification information; and
      display the service ID on a display screen as an optically readable code; and
   wherein the user terminal is configured to:
      receive the service ID by scanning the optically readable code; and
      transmit the received service ID to the service server through an external network to request a user authentication; and
   wherein the service server is configured to:
      receive the service ID from the user terminal;
      decrypt the service ID received from the user terminal;
      perform the user authentication by comparing information included in the service ID with previously stored second vehicle identification information and the terminal identification information; and
      grant the user authentication request when information included in the decrypted service ID matches a previously stored vehicle identification information and the terminal identification information.

2. The user authentication system of claim 1, wherein the service terminal is further configured to call a previously generated and stored first service ID to display as an optically readable code when the first vehicle identification information and a previously stored second vehicle identification information match.

3. The user authentication system of claim 2, wherein, when the first vehicle identification information and the previously stored second vehicle identification information do not match, the service terminal is further configured to:
encrypt the first vehicle identification information to generate a second service ID; and
display the generated second service ID as an optically readable code.

4. The user authentication system of claim 1, wherein the optically readable code is a 2-dimensional QR code.

5. The user authentication system of claim 1, wherein the first vehicle identification information comprises a vehicle identification number (VIN).

6. The user authentication system of claim 1, wherein:
the service terminal comprises a communication modem configured to communicate with the external network; and
the terminal identification information comprises a serial number of the communication modem.

7. The user authentication system of claim 6, wherein the service server is further configured to:
check whether the communication modem is in a subscribed state to a communication network; and
request a communication company to open the communication network for the communication modem when the communication modem is in an unsubscribed state.

8. The user authentication system of claim 1, wherein the service server is configured to not pass the user authentication when information included in the decrypted service ID does not match the previously stored vehicle identification information and terminal identification information.

9. A user authentication method for performing a connected vehicle service, the user authentication method comprising:
receiving, at a service terminal, first vehicle identification information from a vehicle system when the vehicle system is turned on;
encrypting, at the service terminal, the first vehicle identification information and terminal identification information of the service terminal, the terminal identification information having been previously stored in the service terminal;
generating, at the service terminal, a service identification (ID) based on the first vehicle identification information and the terminal identification information;
displaying, at the service terminal, the service ID on a display screen as an optically readable code;
receiving, at a user terminal, the service ID by scanning the optically readable code;
transmitting, at the user terminal, the received service ID to a service server through an external network to request a user authentication;
receiving, at the service server, the service ID from the user terminal;
decrypting, at the service server, the service ID received from the user terminal;
performing, at the service server, the user authentication by comparing information included in the service ID with previously stored second vehicle identification information and the terminal identification information; and
granting, at the service server, the user authentication request when information included in the decrypted service ID matches a previously stored vehicle identification information and the terminal identification information.

10. The user authentication method of claim 9, further comprising calling a previously generated and stored first service ID and displaying the first service ID on a display screen as an optically readable code.

11. The user authentication method of claim 9, further comprising:
determining the first vehicle identification information and the previously stored second vehicle identification information do not match; and
encrypting the first vehicle identification information and the terminal identification information to generate a second service ID and displaying the second service ID as an optically readable code.

12. The user authentication method of claim 9, wherein the optically readable code is a 2-dimensional QR code.

13. The user authentication method of claim 9, wherein the first vehicle identification information comprises a vehicle identification number (VIN).

14. The user authentication method of claim 9, wherein the terminal identification information comprises a serial number of a communication modem included in the service terminal, wherein the communication modem communicates with the external network.

15. The user authentication method of claim 9, further comprising transmitting a user authentication result to a user terminal.

16. The user authentication method of claim 15, wherein transmitting the user authentication result to the user terminal comprises:
requesting additional information for a connected vehicle service subscription to complete the connected vehicle service subscription when the user authentication is passed; and
requesting subscription of a communication modem to a preset communication company after the connected vehicle service subscription is completed and it is determined the communication modem is in an unsubscribed state to a communication network.

* * * * *